(12) United States Patent
Temple et al.

(10) Patent No.: US 6,578,316 B2
(45) Date of Patent: Jun. 17, 2003

(54) ADJUSTABLE ROW CROP ENCLOSURE SYSTEM

(75) Inventors: Andrew B. Temple, Hermitage, AR (US); Beva O. Temple, Hermitage, AR (US)

(73) Assignee: Temple Products LLC, Hermitage, AR (US)

( * ) Notice: Subject to any disclaimer, the term of this patent is extended or adjusted under 35 U.S.C. 154(b) by 0 days.

(21) Appl. No.: 09/916,065

(22) Filed: Jul. 26, 2001

(65) Prior Publication Data
US 2002/0017054 A1 Feb. 14, 2002

Related U.S. Application Data
(60) Provisional application No. 60/222,969, filed on Aug. 4, 2000.

(51) Int. Cl.[7] ............................................. A01G 13/02
(52) U.S. Cl. ......................................................... 47/29.5
(58) Field of Search ................................ 47/29.5, 29.6, 47/2, 20.1, 29.1, 29.2, 25.1, 29.7, 17, 30, 31.1; 135/121, 124, 126, 120.4, 907, 125, 128, 136, 143; 52/2, 25, 23, 64, 66, 86

(56) References Cited

U.S. PATENT DOCUMENTS

| | | | | |
|---|---|---|---|---|
| 2,015,471 A | * | 9/1935 | Genuit | 160/327 |
| 2,674,252 A | * | 4/1954 | Finlayson et al. | 135/118 |
| 2,889,664 A | * | 6/1959 | Olshansky | 47/29.1 |
| 3,769,763 A | * | 11/1973 | Kwake | 428/12 |
| 3,800,468 A | | 4/1974 | de Graff | |
| 4,020,591 A | | 5/1977 | Seffings | |
| 4,068,423 A | * | 1/1978 | Marsh | 135/118 |
| 4,186,520 A | | 2/1980 | Alper | |
| 4,296,568 A | | 10/1981 | Dukes | |
| 4,347,685 A | | 9/1982 | Medford | |
| 4,348,831 A | | 9/1982 | Chambers | |
| 4,442,626 A | | 4/1984 | Hammond | |
| 4,513,530 A | | 4/1985 | Nyboer | |
| 4,658,538 A | | 4/1987 | Kolk | |
| 4,771,570 A | | 9/1988 | Nyboer | |
| 4,798,023 A | | 1/1989 | Morssinkhof | |
| 4,856,228 A | | 8/1989 | Robinson | |
| 4,888,913 A | | 12/1989 | Hoeft | |
| 5,083,396 A | | 1/1992 | Traut | |
| 5,179,798 A | | 1/1993 | Songapore | |
| 5,241,782 A | | 9/1993 | McCarthy | |
| 5,605,007 A | | 2/1997 | Hinsperger | |
| 5,815,991 A | | 10/1998 | de Ridder | |
| 5,956,923 A | | 9/1999 | Andros | |

FOREIGN PATENT DOCUMENTS

| | | | | | |
|---|---|---|---|---|---|
| DE | 3042990 A | * | 7/1982 | ............ | A01G/9/16 |
| FR | 2465048 A | * | 4/1981 | ............ | A01G/9/16 |
| FR | 2609595 A | * | 7/1988 | ............ | A01G/9/14 |
| JP | 62138121 A | * | 6/1987 | ............ | A01G/9/14 |
| JP | 403053820 A | * | 3/1991 | ............ | A01G/9/14 |
| JP | 408172941 A | * | 7/1996 | .......... | A01G/13/02 |
| JP | 408280273 A | * | 10/1996 | .......... | A01G/13/02 |
| JP | 409070232 A | * | 3/1997 | ............ | A01G/9/24 |
| JP | 11046595 A | * | 2/1999 | ............ | A01G/9/14 |
| JP | 2002065078 A | * | 3/2002 | ............ | A01G/9/16 |

* cited by examiner

*Primary Examiner*—Peter M. Poon
*Assistant Examiner*—Son T. Nguyen
(74) *Attorney, Agent, or Firm*—Stephen D. Carver

(57) ABSTRACT

A retractable, plastic enclosure (30) for row crops, ideally tomatoes, comprises a pair of plastic walls (33, 34) bordering the seedbed (22) that are supported by spaced-apart ribs (40, 42). Row crops between the closed walls are shielded from extreme conditions including frost, heavy rain, freeze, hail, and winds. The multi-ply, plastic walls are formed by folding a sheet of plastic. Arcuate ribs (40, 42) flexibly secure the walls in symmetric, spaced apart, parallel rows adjoining crops on either side of the raised seedbed. The walls may be yieldably drawn together or forced apart by drawstrings (82, 80). The ribs are formed from multiple separate strips (50, 52) that are stapled together and sandwich at least one wall layer. The drawstrings are routed between spaced-apart rib guides in a zigzag fashion. Tensioning of the lower drawstring closes the walls, sheltering the young row crops. The upper drawstring opens the walls.

20 Claims, 12 Drawing Sheets

ADJUSTABLE ROW CROP ENCLOSURE SYSTEM

CROSS REFERENCE TO RELATED APPLICATION

This application is based upon and incorporates the disclosure and teachings of prior U.S. Provisional Patent Application No. 60/222,969, filed Aug. 4, 2000, and priority based upon said prior Provisional Application filing date is claimed.

BACKGROUND OF THE INVENTION

I. Field of the Invention

The present invention relates generally to row crop enhancement and protection devices. More particularly, the present invention relates to an adjustable, plastic enclosure system that protects row crops and extends their growth period by moderating extreme effects of weather, temperature and environment.

II. Description of the Prior Art

Many important agricultural row crops have specific growing and harvesting seasons that are broadly related to geography, latitude, climate and the like. As a result, all of the farms producing a given product in similar geographic regions plant and harvest crops in generally similar time periods. The similarity in planting and harvesting schedules results in an abundance of produce being offered to the marketplace around the harvest time, and commodity prices drop. The harvest time or "selling season" of many products is further shortened by the shelf life and transportation requirements of the harvested product. As a result great quantities of fruits and vegetables harvested from similar geographic regions are offered to the marketplace within a relatively short time span, depressing the market price for the farmer's wares.

As a result, the desirability of extending the growing and harvesting season of certain plants, including row crops, has been recognized previously. Many plants can be cultivated and produced within greenhouses or other suitable protective enclosures. Such enclosures extend the growing season by moderating the extremes of weather and climate. However, expensive greenhouses are not suitable for economical use with certain row crops such as tomatoes. Certain inexpensive and temporary protective enclosures have been suggested in the art for protecting row crops. It is recognized that by partially enclosing crops with protective sheets of plastic, for example, they can be protected in part from the damaging effects of wind and cold.

Some prior art wind-shielding devices and partial enclosure arrangements have been applied to row crops. On prior protective product used for tomato farming is known under the trade name Reemay™. This sheet-like product is a cloth, and is applied to rows of seedbed for planting row crops such as tomatoes. Various protective "tunnels" formed with planar sheeting material that covers only the seedbeds between furrows are known. Such tunnels or seedbed covers with or without holes or perforations or slits are known. All of these control and protect seedlings in the early planting stages of row cropping, by forming a moisture and wind barrier that also traps heat to warm the crop roots. In the tomato industry, it is virtually mandatory for a competitive yield that furrows be shielded with such sheet-like materials.

Prior U.S. Pat. Nos. 4,020,591 and 5,605,007 disclose elongated, tunnel-like enclosure systems that can be used with row crops.

U.S. Pat. Nos. 4,442,626 and 5,179,798 disclose miniature greenhouse systems comprising elongated, flexible enclosures adapted for placement over row crops. In both systems translucent plastic is suspended over the seedbed over spaced-apart, inverted U-shaped frames.

Relatively large-scale tunnel-like enclosures are also seen in U.S. Pat. Nos. 4,856,228 and 5,815,991. The devices disclosed therein require lateral anchoring with soil at the opposite edges of the seedbed.

U.S. Pat. No. 4,296,568 discloses a rigging system for closing a crop covering apparatus.

SUMMARY OF THE INVENTION

Our system provides a twin-sided plastic enclosure for row crops, ideally tomatoes, that moderates the extremes of temperature and weather. For example, the invention successfully protects row crops from adverse conditions such as frost, heavy rain, freeze, hail, and strong winds. It enables farmers or gardeners to plant several weeks sooner than normal planting times used in their areas, and the growing season is effectively extended.

Preferably, the invention comprises a pair of elongated, plastic walls erected on opposite sides of a plastic-sheeted seedbed. Each wall, which is preferably of semi-circular cross section, is preferably formed from a folded sheet of translucent, plastic. Each wall preferably comprises at least two plies of translucent plastic, but multiple plies involving three of more sheets may be used. Spaced-apart, ribs periodically support each wall. The resilient, plastic ribs provide a skeletal framework that maintains the walls in long, similarly configured, parallel rows. These elongated rows adjoin the row crop on either side of the raised seedbed, jointly presenting a generally tubular appearance, and confining a volume between them.

Preferably each rib comprises two or more separate strips that when joined together as described herein captivate and reinforce the walls. The tops of the opposed walls are normally spaced apart above the seedbed, to expose the young crop to the environment, admitting rain and sunlight. Further, the normally open top vents heat to avoid overheating and plant degradation at the critical early stages of development or growth.

The suitably configured rib bottoms penetrate the seedbed and maintain the ribs in an upwardly projecting orientation. Preferably the ribs penetrate suitable orifices or slits formed in the normally included plastic seedbed liner overlying the seedbed. The plastic walls are suspended over and upon the upright ribs for dependable support. Preferably the sheets are sandwiched between adjoining rib strips. The exposed ribs mount suitable eyelets for routing drawstrings entrained through the ribs. Preferably the ribs comprise metallic stiffeners that are attached to them for rigidity. The reinforcing stiffeners may be sandwiched between rib strips, or they may longitudinally penetrate the interior of one or more of the rib strips. The eyelets may be secured to, and integral with, the metallic reinforcements.

The drawstrings are routed between and along walls down the crop rows, alternating between spaced-apart rib guides in a zigzag fashion. The lower drawstring can draw the walls together to close the gap at the top of the seedbed to cover young plants. The upper drawstring will force the closed walls apart. When upper drawstrings are activated by the farmer as, for example, on a warm day, the "vent" between opposed wall tops is exposed and temperature is moderated. When the "vent" is closed (i.e., when the walls are drawn together by the lower drawstring), the crops are effectively protected from frost, freeze or other adverse factors.

Thus the broad object of our invention is to protect row crops.

Another broad object of our invention is extending the row crop-growing season available to farmers.

A related object is to optimize the farmer's selling season so that crops are offered when more favorable market prices are available.

Another broad object is to moderate the effects of extreme climate and weather upon row crops such as tomatoes and the like.

A similar object is to allow row crops to be planted earlier or later in the season.

Another object is to enable a grower to harvest better quality and quantity yields by protecting the row crop from wind damage. It is a feature of our invention that wind stresses that can damage or even blow away plant blooms, are significantly reduced.

Yet another object is to protect row crops from excess rainfall, wind, and hail damage.

A still further object is to protect row crops from being damage by wild animals including deer, birds, raccoons, rabbits, etc.

Another object is to protect row crops from insect damage.

A further object is to provide a system of the character described that is easily installed and operated by the farmer.

A further object is to provide a system of the character described that can be installed without partially burying it. It is a feature of our invention that the edges need not be anchored with soil when installed.

Another related object is to provide a system of the character described that prevents flooding over the seedbed. It is an important feature of our invention that excessive water cannot accumulate upon the plastic covering overlying the seedbed, since the system walls do not form a watertight seal at their bottom edges.

Yet another object is to protect and shield plants nurtured within the system from strong, hot or cold winds.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
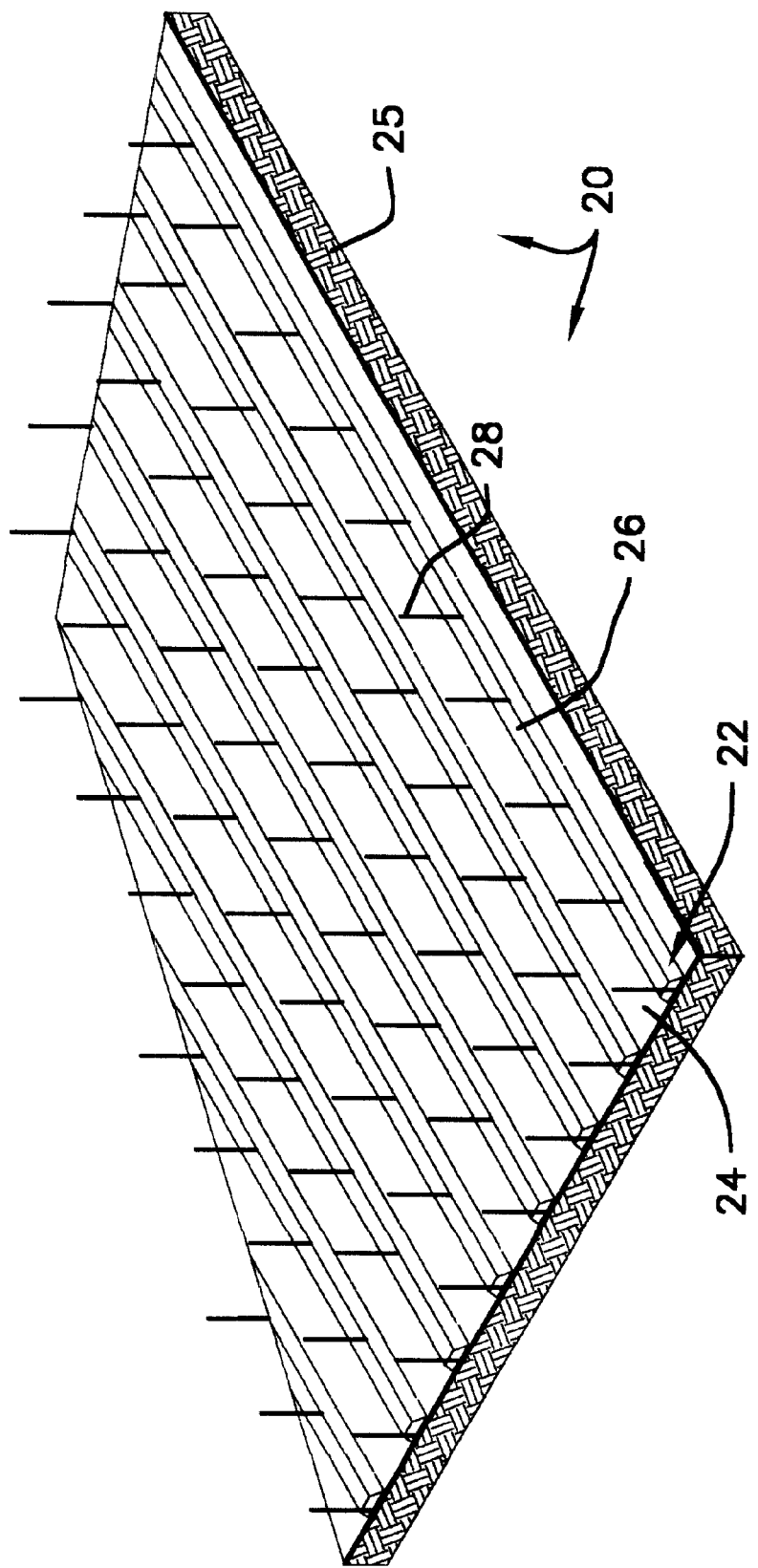
FIG. 1 is a fragmentary, frontal perspective view of a tomato field that has been prepared for planting through conventional techniques, prior to installation of our system.

Turning now to the drawings, FIG. 1 reveals a conventional tomato field 20 that has been conventionally prepared for planting. A plurality of elongated, parallel seedbeds 22 are disposed between parallel furrows 24. The elongated seedbeds are each raised above the furrows 24 approximately one to two inches, and they are covered with ultraviolet resistant, black plastic sheets 26 whose sides are submerged within the soil 25 for proper anchoring. Typically a number of vertically upright crop-support sticks 28 are regularly spaced-apart along the length of each seedbed 22. Young plants are conventionally rooted between the sticks 28, with their roots placed through suitable orifices made in the plastic sheets 26 covering the seedbed. As young tomato plants grow, they may be tied to support sticks 28 on opposite sides with suitable twine, and the sticks will reinforce the resultant rows. These sticks 28 are not part of our invention and their use is not mandatory, but they may be deployed before or after implementation of our system 30, depending upon the farmer's preference.

Figure 4:
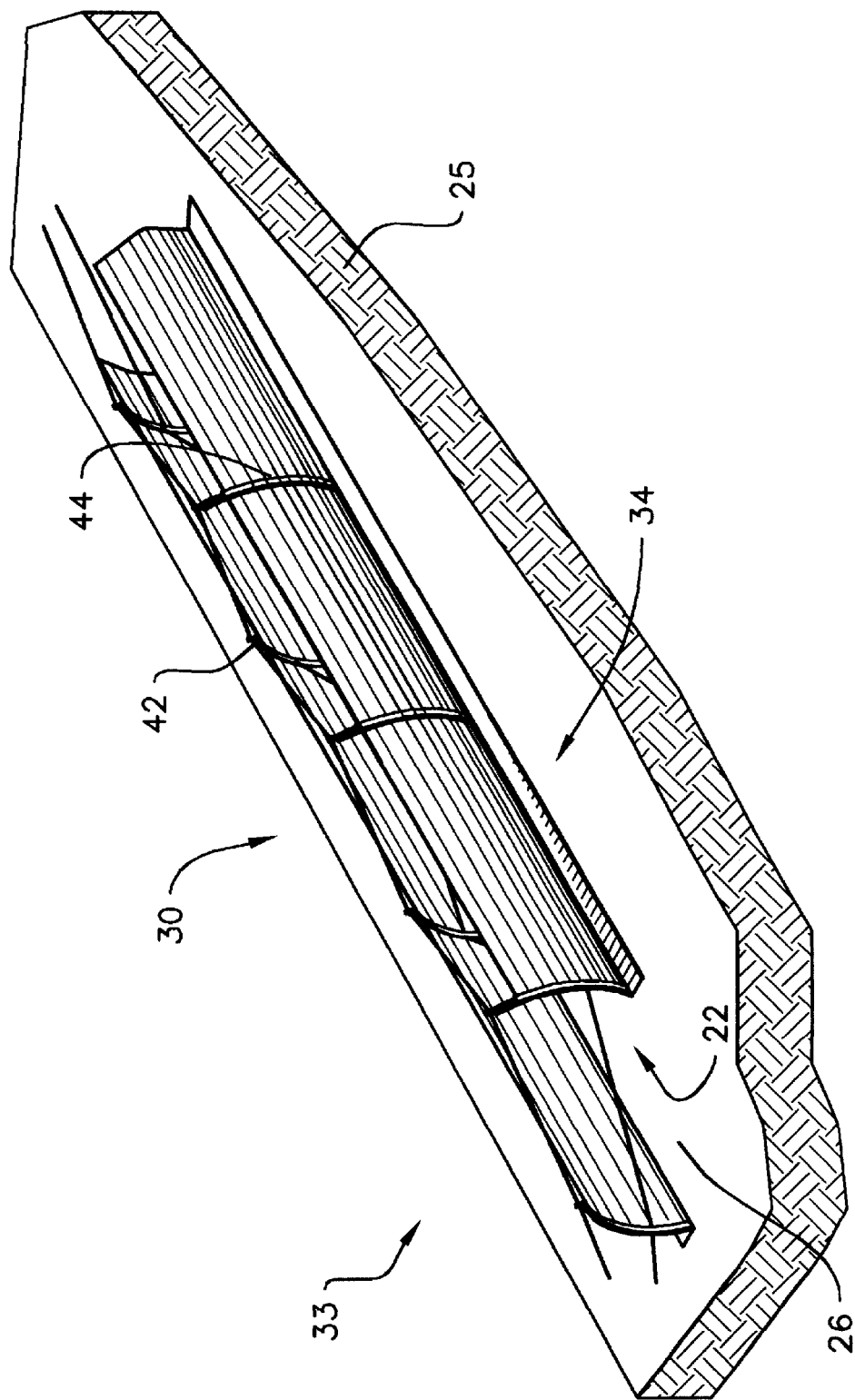
FIG. 4 is a fragmentary side perspective view similar to FIG. 3, but showing the enclosure partially closed.

The best mode of our system has been designated by the reference numeral 30 (FIG. 2) A pair of similar, spaced-apart, twin-ply walls 33 and 34 are disposed upon each side of each seedbed 22, in generally vertical relation to the lower, horizontal sheets 26 (FIGS. 4–6) that cover the seedbed. Each protective, plastic wall 33, 34, is preferably formed by folding a unitary plastic sheet of thin, clear, UV-stabilized plastic approximately 1.0 millimeter thick. The twin wall plies are each twenty to thirty inches wide (in the best mode they are twenty-four inches wide) and they are positioned or folded over one portion of the supporting rib (to be discussed 6 hereinafter). Alternative walls 35 (FIG. 7) and 36 (FIG. 8) of alternative embodiment 30A are similar, but have different ribs.

Each wall 33–36 assumes a generally semi-circular cross section. As best seen in FIGS. 2–5, the bottom edges of each wall form a lower flap 37 that gently overlies the plastic sheet 26. The top edges 39 (FIGS. 5, 6) result from the material fold line, and form the tops of the walls. As explained later, these tops can be drawn together to close the system. The multi-layer wall design confines an air pocket between plies that greatly enhances the thermal holding ability of the system.

A plurality of support ribs 40, 42 are spaced-apart down the length of each seedbed. A row of vertically upright, arcuate ribs is associated with each wall, at each side of the seedbed. The ribs in one row are staggered with respect to corresponding ribs in the companion row across the seedbed. Preferably the ribs are arranged in alternating fashion (i.e., a left rib 40 is placed at a given location, and at a selected length interval later, a right rib 42 is secured as in FIGS. 3 and 4.) Preferably multiple ribs are located roughly five feet apart to provide adequate support, even in strong wind conditions. To accommodate more adverse weather conditions, the support ribs should be spaced closer together. For economical reasons, the ribs should be attached as far apart as possible, but the selected arrangement must offer the stability needed for a reliable structural design.

These resilient plastic ribs 40, 42 (FIGS. 5, 6) have bottom ends generally designated by reference numerals 44 and 44A respectively. Resilient plastic ribs 40A, 42A (FIGS. 7, 8) have bottom ends generally designated by reference numerals 43 and 43A respectively. During installation, the rib ends are forced through the horizontal plastic covering sheets 26 into the seedbed soil 25 for supporting the ribs generally perpendicularly as illustrated. The plastic walls 33–36 are preferably attached to the ribs by staples, rivets, or the like. The resilient ribs give the walls a semi-circular cross section. Rib tops 45 (FIGS. 5, 6, 13) are freely exposed at the top of each wall. Support ribs 40, 40A are disposed on the left (i.e., as viewed in FIGS. 5, 7) and ribs 42, 42A are disposed on the right side. They vertically extend upwardly from the seedbed, but they project towards each other and the opposite side or wall of the system.

A preferred rib 40 comprises multiple layers or plies. At least two plies are made of corrugated plastic, each of which is approximately one inch wide. Adequate rib material is available under the brand name Coroplast™ manufactured by Coroplast Inc. in Dallas, Tex., USA. In alternative embodiments, the ribs may comprise two or three separate plastic strips, layered on top of one another and forming a laminate structure. One or more metallic stiffeners may be sandwiched between select layers, or the stiffeners may axially penetrate selected laminations, as described later.

Figure 9:
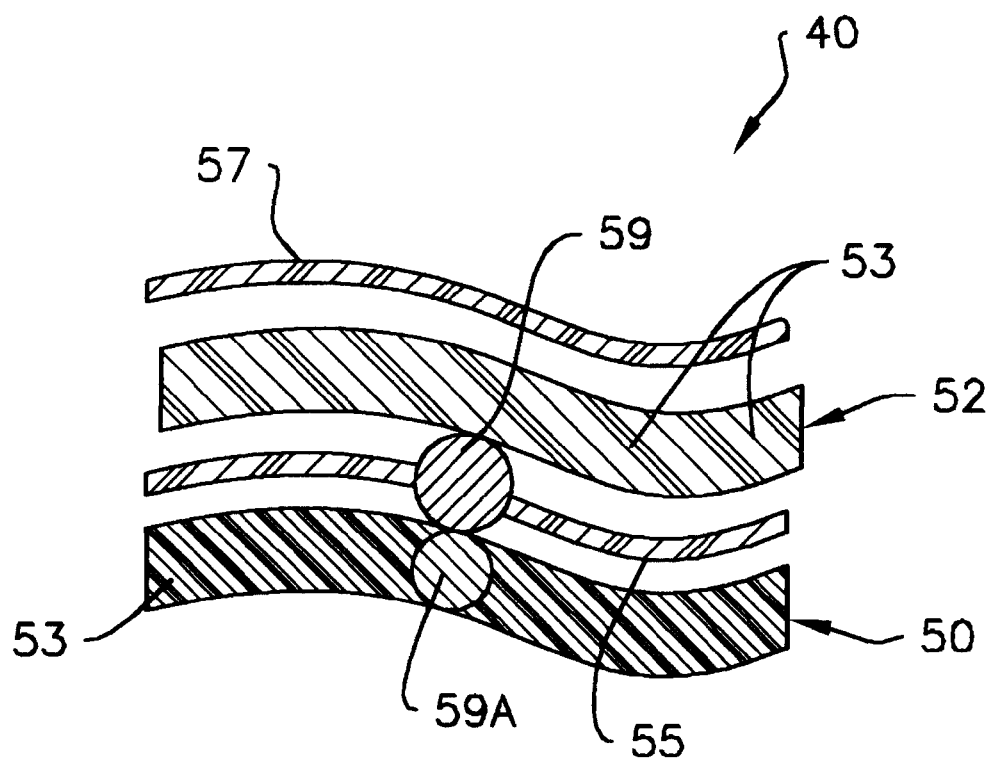
FIG. 9 is an enlarged fragmentary sectional view taken generally along line 9—9 of FIG. 5.
Figure 11:
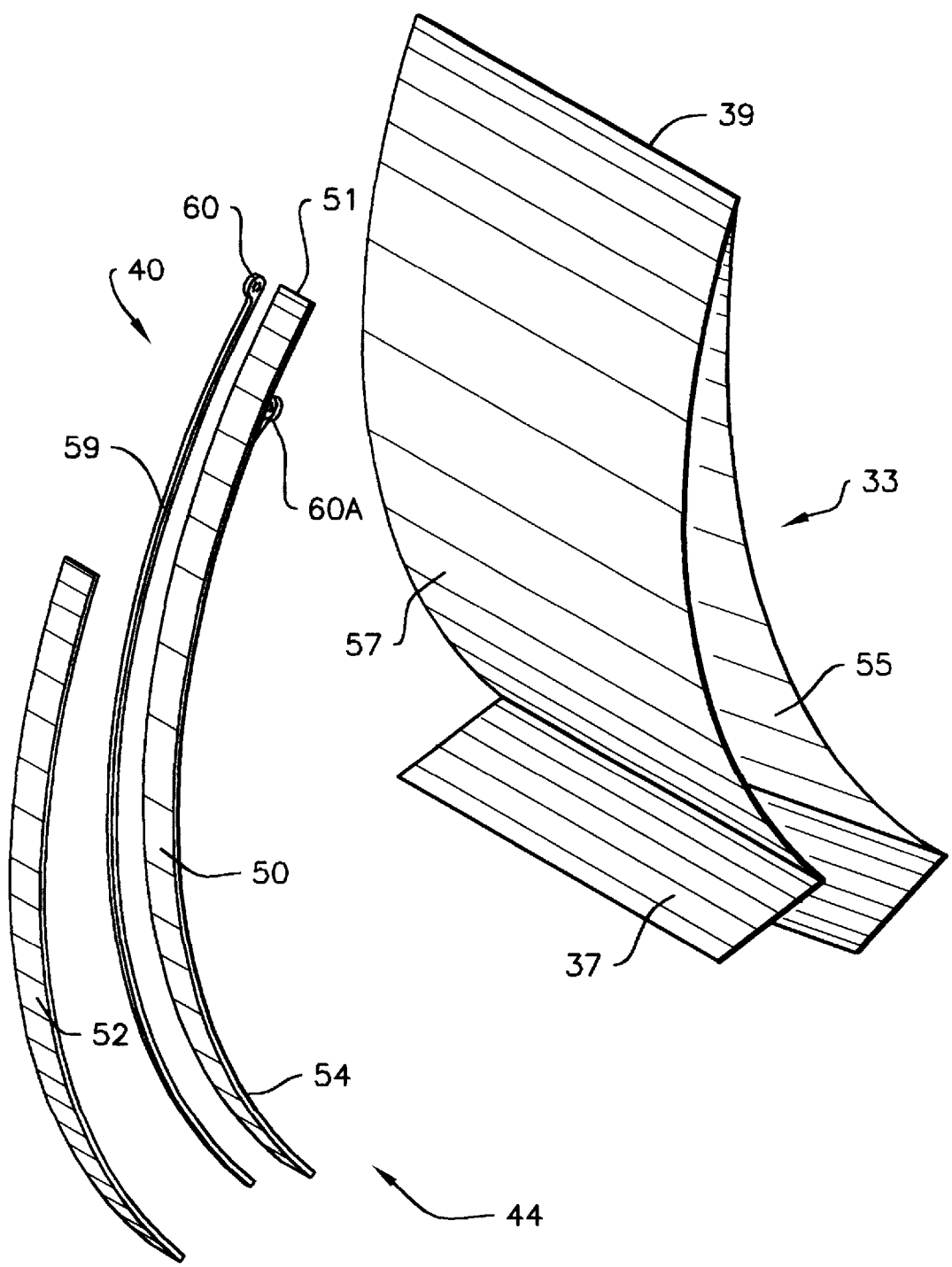
FIG. 11 is an exploded isometric view of the left side of a crop row equipped with our preferred ribs.
Figure 12:
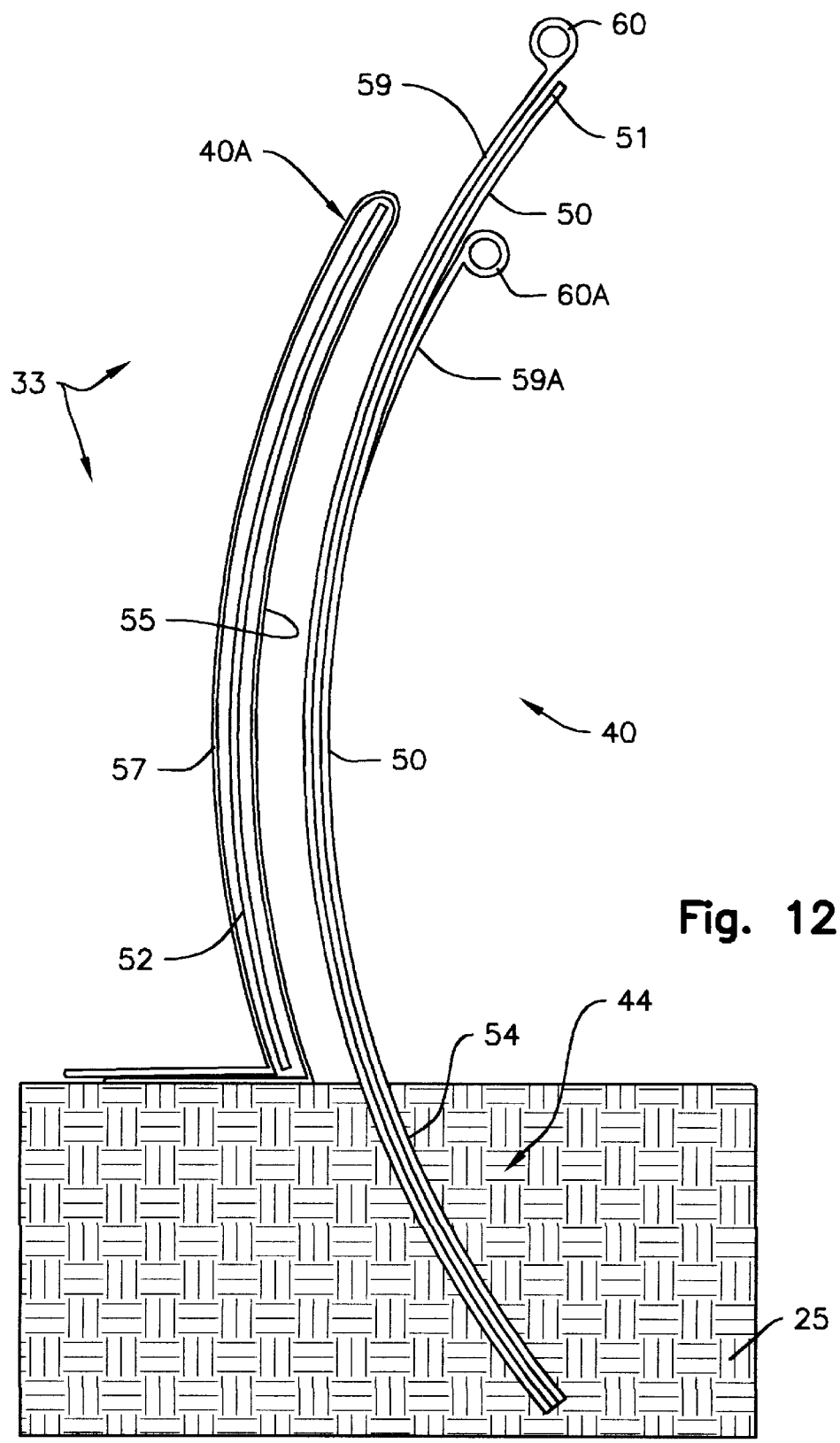
FIG. 12 is an enlarged fragmentary sectional view looking into a typical left side and showing an alternative rib; and, FIG. 13 is an enlarged, fragmentary isometric view of circled region 13 of FIG. 2.

A typical and preferred two ply rib 40 (FIGS. 5, 9, 11, 12) comprises a relatively long inner, strip 50 which is approximately thirty-seven inches long, and a shorter outer strip 52 approximately twenty-four inches long. Preferably. all the rib strips are cut from bulk, corrugated plastic material so that the integral corrugation flutes 53 (FIG. 9) run parallel with the rib's length. In assembly, the typical two-ply, left wall 33 is secured about the shorter outer rib strip 52, encasing rib strip 52 in the translucent wall plastic. The inner layer 55 of wall 33 (FIGS. 11, 12) is sandwiched between rib strips 50 and 52, and the exposed wall ply 57 (FIG. 11) forms the outside of the wall 33. Alternatively, a third rib strip (not shown) can be added to the arrangement on top of rib strip 52, sandwiching the outer wall layer 57 (FIG. 11) between it and rib strip 52. The rib strips are preferably stapled together.

An exposed lower end 54 (FIGS. 11, 12) of the longer strip 50 overhangs the plastic wall 33 by approximately six inches, forming ground penetrating end 44 (FIGS. 5, 6, and 11, 12). An upper end 51 (FIG. 11) of the longer strip 50 is exposed at the top. When the walls are closed, the upper ends of all ribs project over the top of the opposite wall. If a third outer strip is placed upon strip 52, its lower end should overhang the plastic wall 33 by approximately seven inches. The rib 40 and its constituent strips 52, 50 (FIG. 11) are preferably braced by internal, wire stiffeners. Stiffener 59 (FIGS. 9, 11,12) is sandwiched between the rib strips 50 and 52 described previously. The stiffener 59 reinforces the wall 33 and the wall layers 55, 57 adjoining it. An integral eyelet 60 (FIG. 11) on the top of stiffener 59 constrains drawstrings to be described later. Viewing FIG. 12, companion stiffener 59A penetrates one of the channel-like flutes 53 (FIG. 9) of the inner rib strip 50; it presents another eyelet 60A for drawstring control.

Rib 42 (FIG. 6) is substantially the mirror image of rib 40. The stiffener 61 supports an integral eyelet 62 for constraining the top drawstring. An auxiliary stiffener 63 (FIG. 6), which is inserted through one of the channels within inner rib strip 65, supports eyelet 64 for another drawstring.

Figure 7:
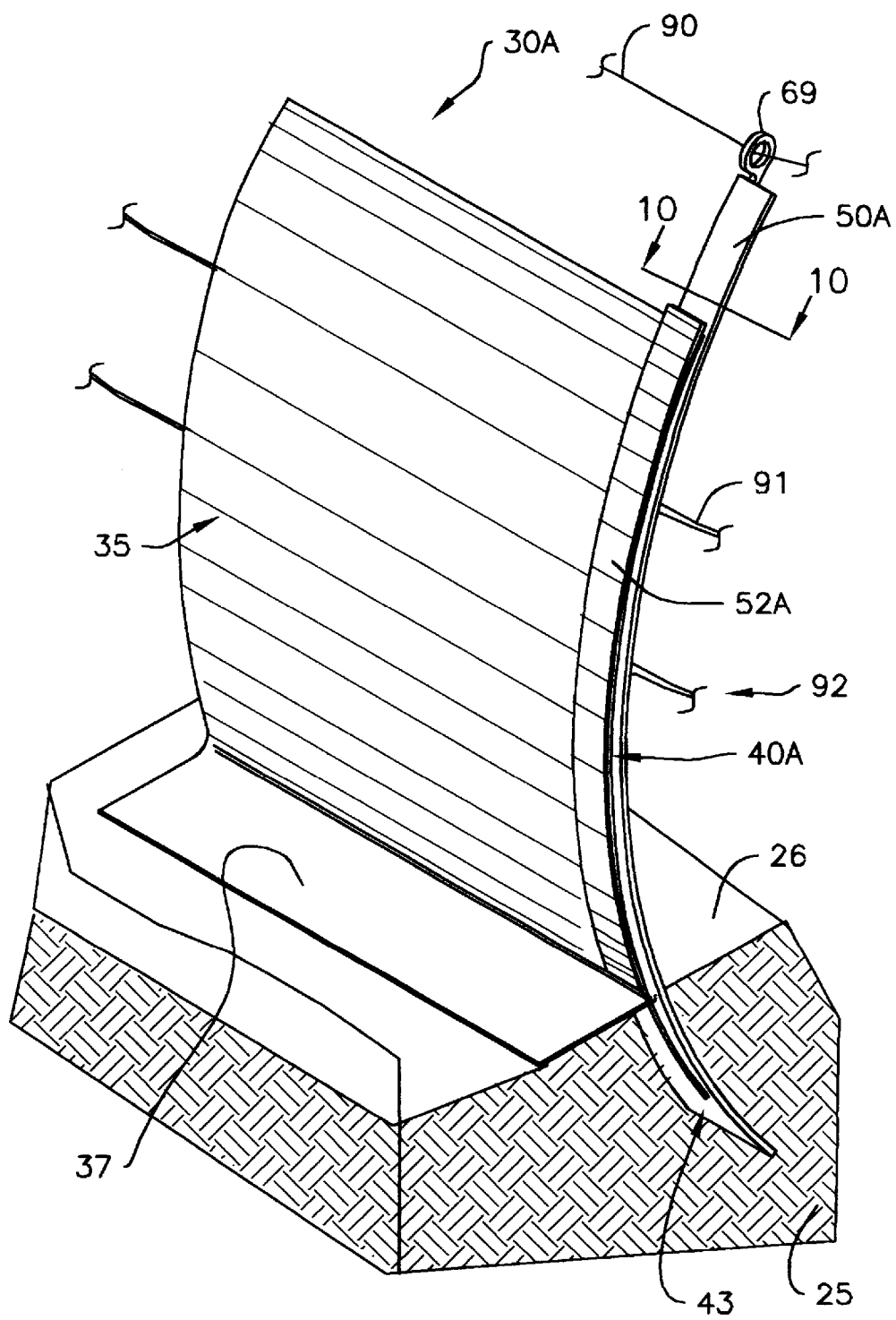
FIG. 7 is a fragmentary, side perspective view of an alternative left wall.
Figure 10:
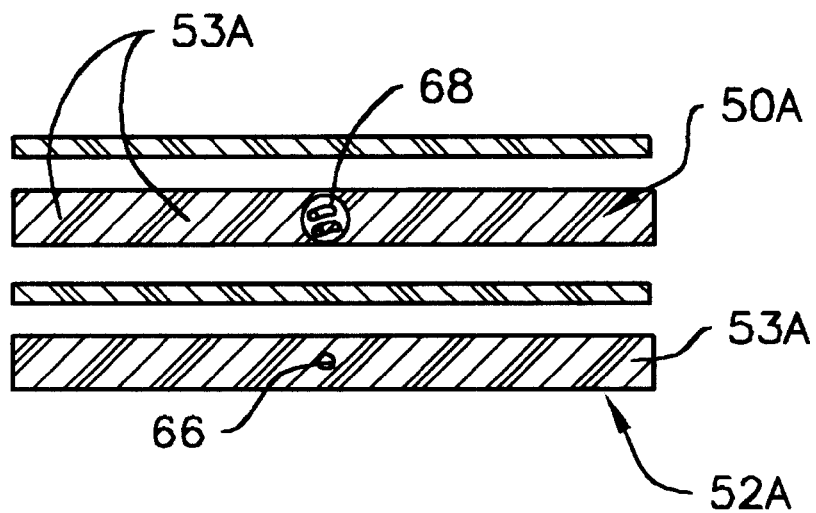
FIG. 10 is an enlarged fragmentary sectional view taken generally along line 10—10 of FIG. 7.

Alternative two ply ribs 40A and 42A in walls 35 and 36 (FIGS. 7, 8) are similar. Rib 40A in wall 35 comprises a relatively long inner, strip 50A which is approximately thirty-seven inches long, and a shorter outer strip 52A approximately twenty-four inches long. The two-ply, plastic wall 35 (FIG. 7) is secured about the outer rib strip 52A, The inner wall layer is sandwiched between rib strips 50A and 52A. Rib 40A has a wire stiffener 68 (FIG. 8) inserted directly into a flute 53 (FIG. 10) of longer strip 50A. Each stiffener 68 supports an upper drawstring support eyelet 69. Rib 42A of wall 36 (FIG. 8) has a wire stiffener 68 inserted directly into a flute 53A (FIG. 10) of shorter strip 52B. Each stiffener 68 supports an upper drawstring support eyelet 69B (FIG. 18). An auxiliary stiffener 66 (FIG. 10) penetrates a flute 53A within longer rib strip 50B and supports a eyelet 71 (FIG. 8) for the lower drawstring 91 (FIG. 7).

All stiffeners are preferably made from high tensile, high carbon, spring steel wire of sufficient diameter to allow for easy insertion into the flutes 53 (FIGS. 9, 10) This wire forms a semi-circle as it comes off the spool that is desirable to give the shape and strength to the rib structure. The attachment of the support rib to the clear plastic should continue at regular intervals. The more narrow the interval, the more stable the device.

Figure 2:
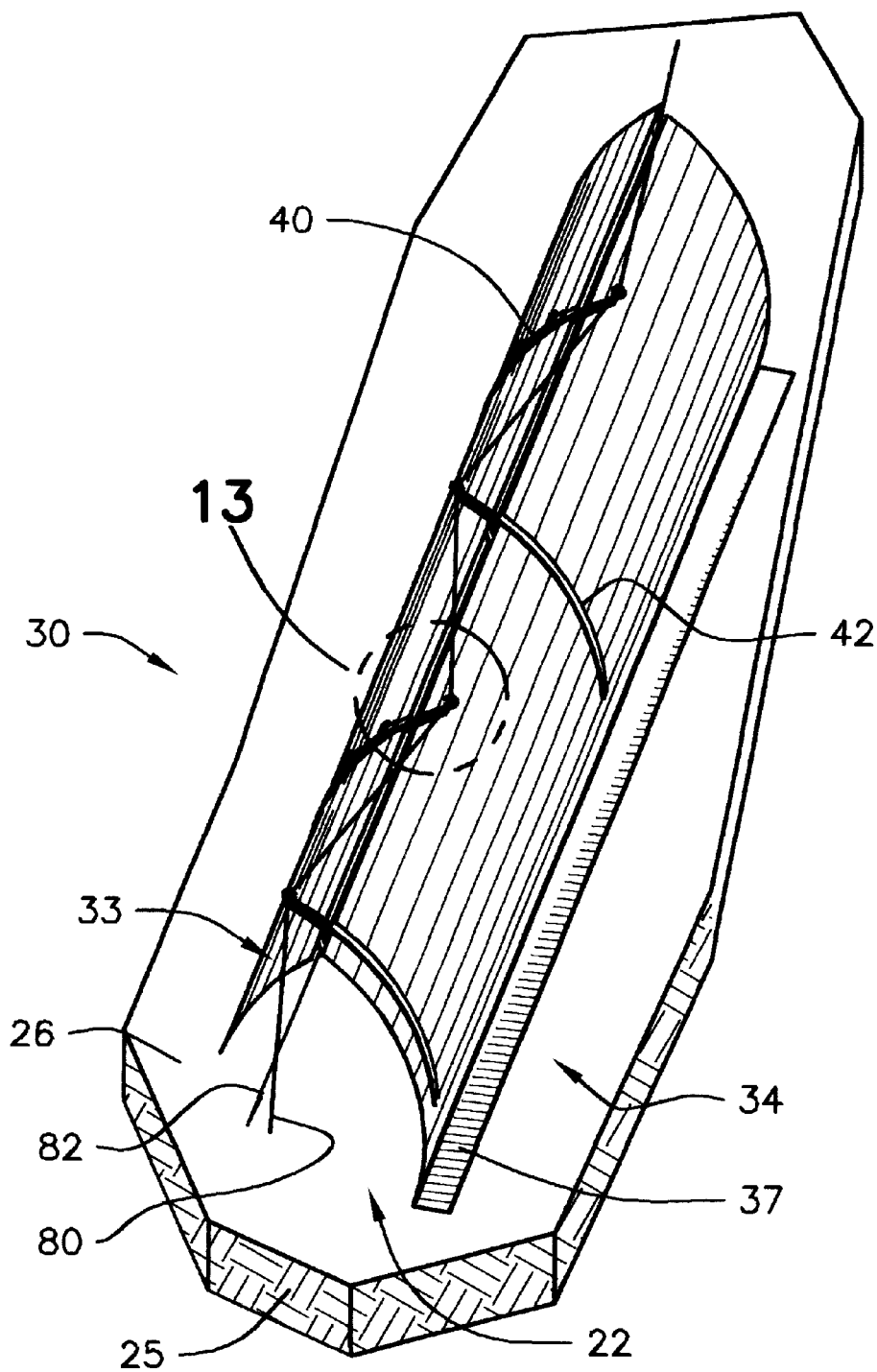
FIG. 2 is a frontal perspective view of our preferred system, with the walls closed.
Figure 3:
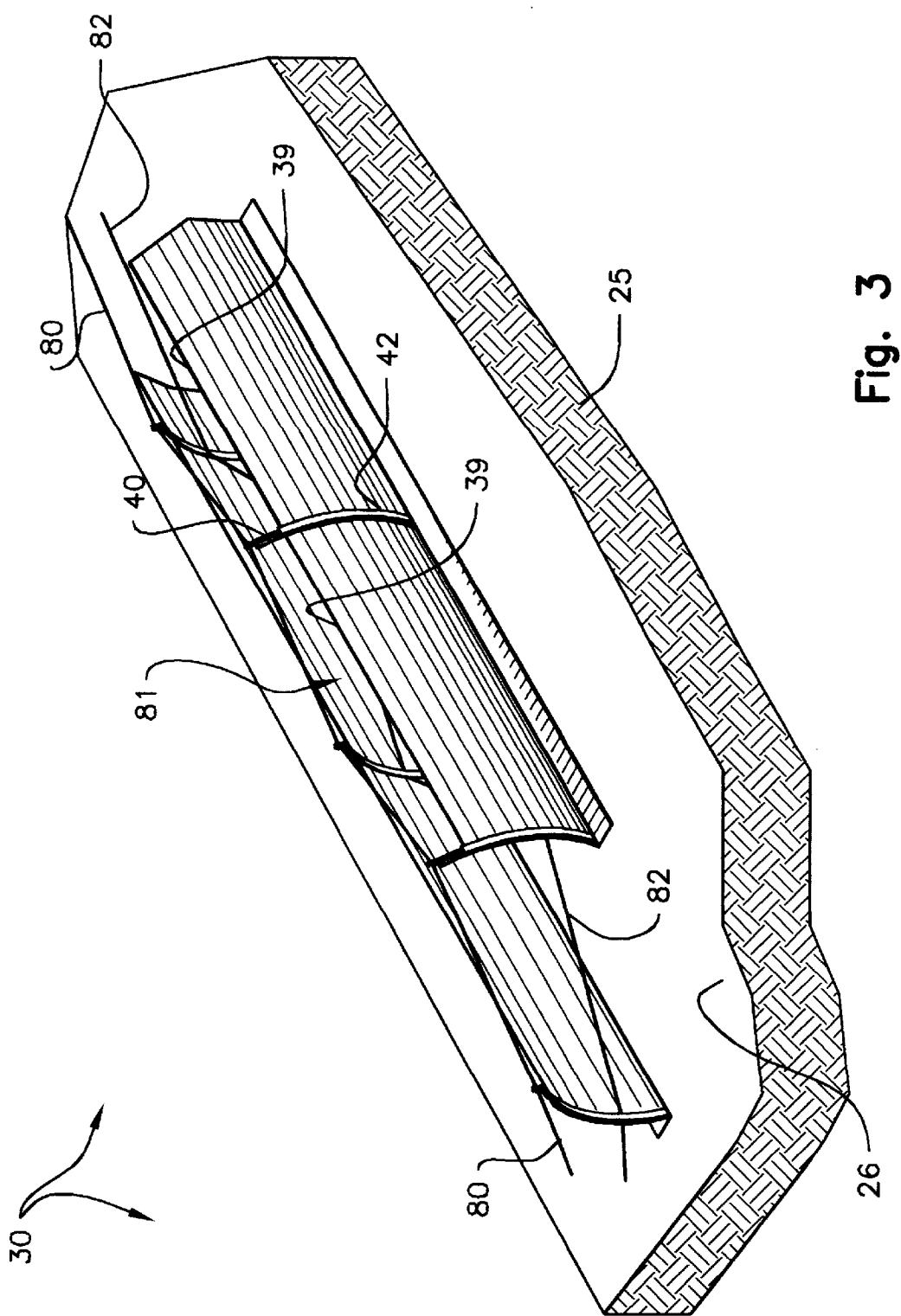
FIG. 3 is a fragmentary, frontal perspective view of our preferred system, with the walls open.
Figure 5:
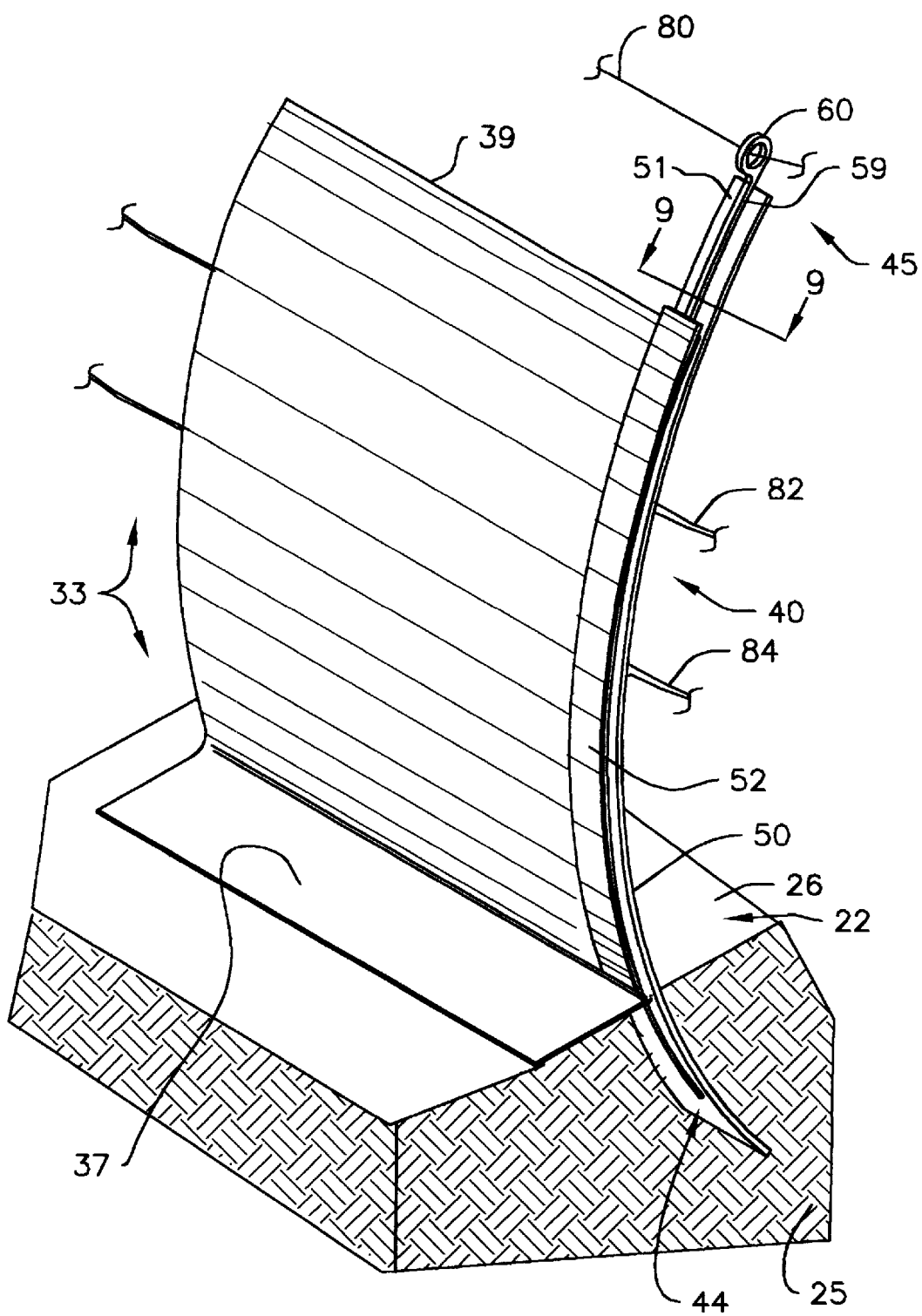
FIG. 5 is a fragmentary, side perspective view of a preferred left wall.
Figure 6:
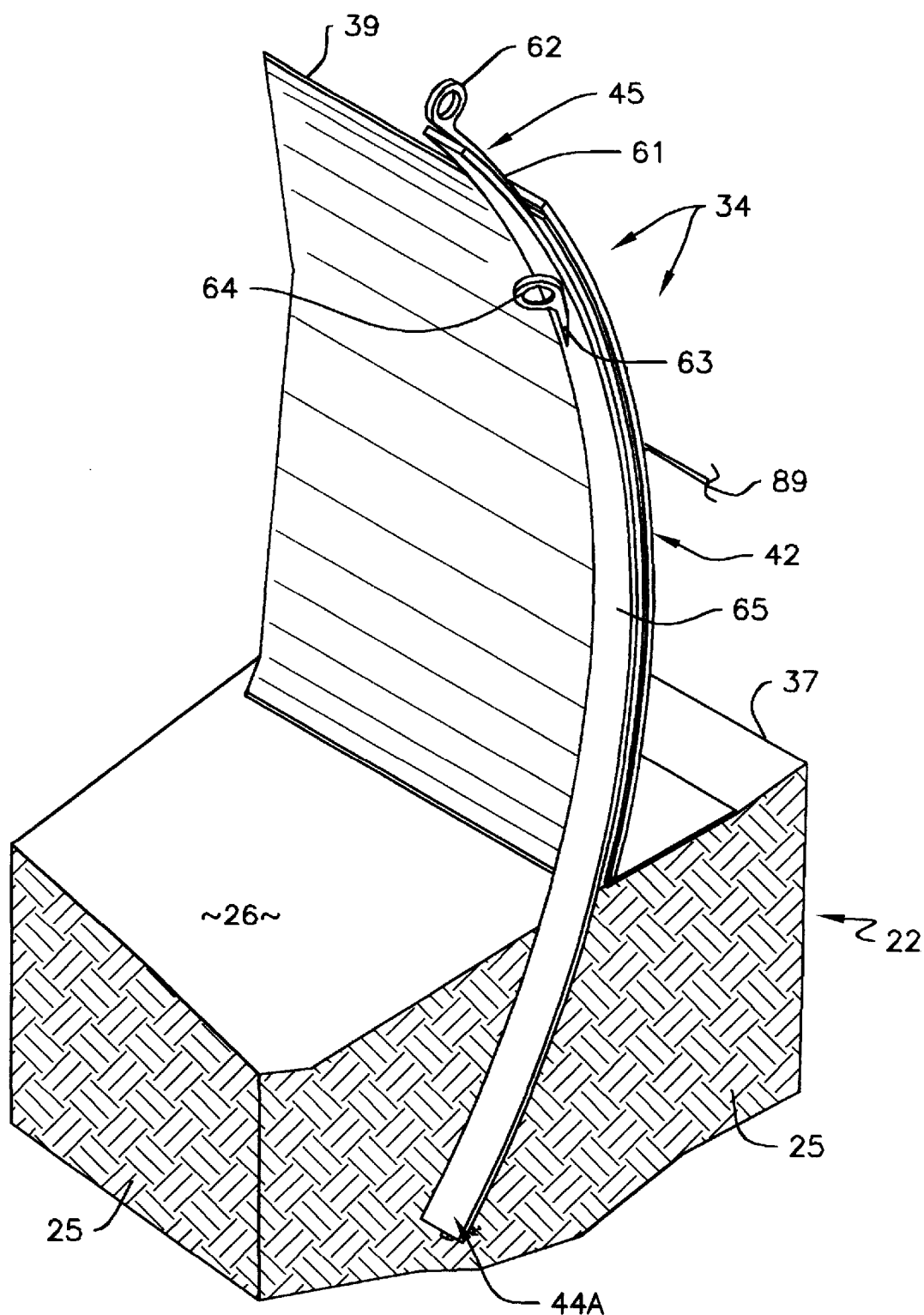
FIG. 6 is a fragmentary, side perspective view of a preferred right wall.
Figure 13:
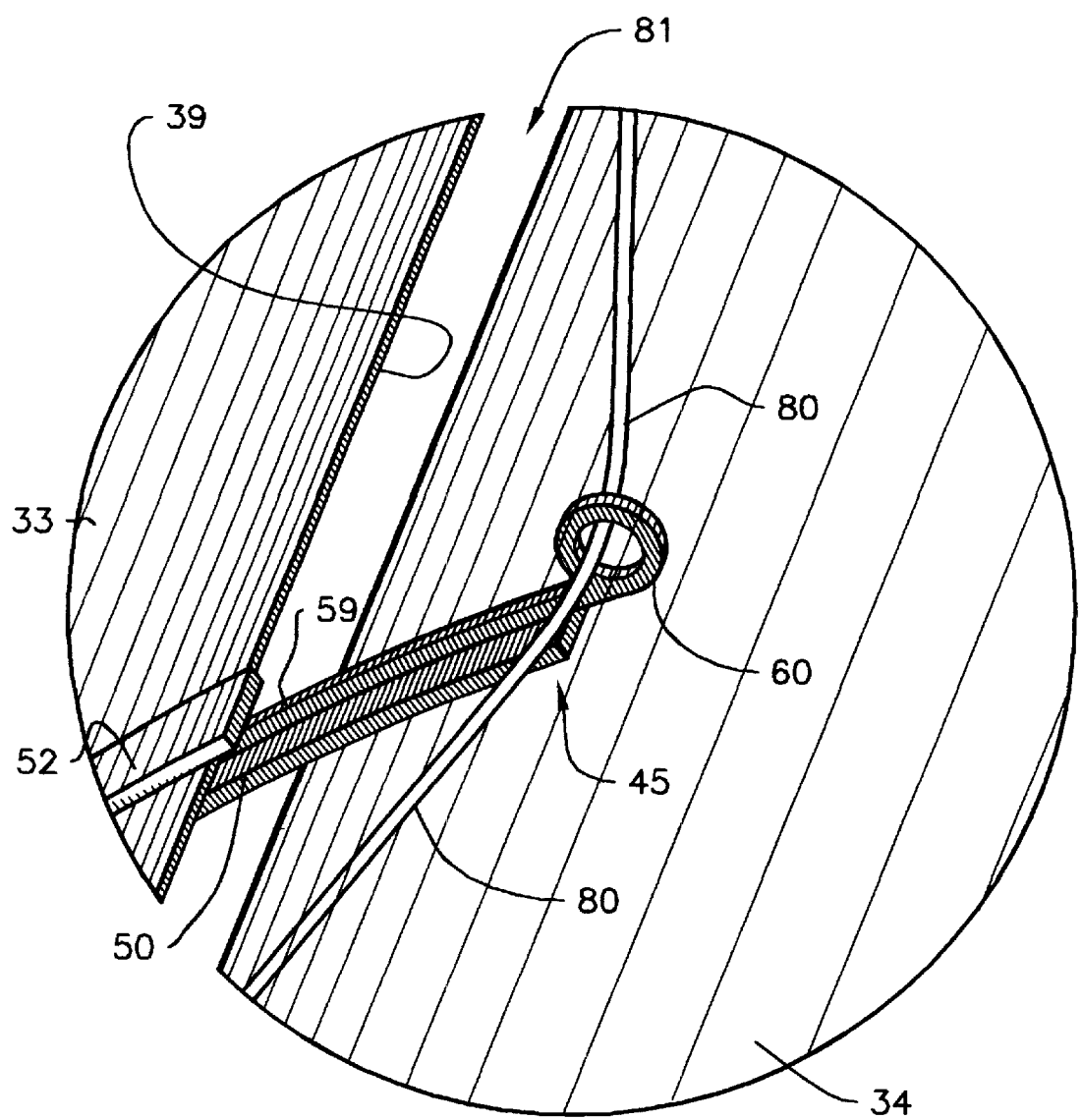

As seen in FIGS. 2 and 3, upper and lower drawstrings extend down each wall, and top strings are zigzagged alternately between opposed walls. For example, walls 33 and 34 (FIGS. 5, 6, 12) have upper and lower drawstrings 80, 82 extending along their length, which zigzag between the walls. When tensioned, the lower drawstring 82 closes the system by drawing the walls together, and straitening (FIG. 2). With the walls closed in this fashion, the upper portion of each rib projecting from one wall will overlie the top of the opposite wall, as seen in FIG. 13. The upper drawstring 80 will thus assume a zigzag orientation and be relatively loose when the walls are totally closed (FIG. 2). The upper drawstring opens the closed walls by forcing apart the tops of staggered, opposed ribs, thus straightening. Eyelets 60 (FIGS. 5, 13) and 62 (FIG. 6) in the series of ribs 40 (FIG. 5) holding wall 33 are alternately penetrated by the upper drawstring 80 (FIG. 5). Lower eyelets 60A (FIG. 12) and 64 (FIG. 6) support lower drawstring 82 (FIG. 5). Opposite wall 34 (FIG. 6) receives upper drawstring 80 and lower drawstring 82 in alternating fashion through its eyelets 60, 64. Optionally a ply separator string 84 extends between the plies of ribs 40 in wall 33 (FIG. 5), and a ply separator string 89 runs the length of wall 34. The drawstrings and ply separator strings used with modified walls 35 and 36 (FIGS. 7, 8) are similarly arranged.

A vent 81 (i.e., FIG. 13) is formed at the top of the system between opposed wall top edges 39. The upper drawstring 80 (FIGS. 5, 13) extends along each row crop near vent 81 between the plastic walls, alternately engaging wall 33 and then wall 34, switching between opposite upper eyelets 60 and 62. Similarly the lower drawstring 82 (FIG. 5) can zigzag between the lower rib eyelets 64 (FIG. 6) and 60A (FIG. 12) on each wall. The lowermost ply-separator string 84 (FIG. 5) is optional, and does not zigzag between opposed walls. When tensioned longitudinally the optional ply separator strings 84, 89 (FIG. 6) separate plies in the arcuate walls 33, 34 to add air volume between adjacent wall plies for an enhanced insulating effect.

Figure 8:
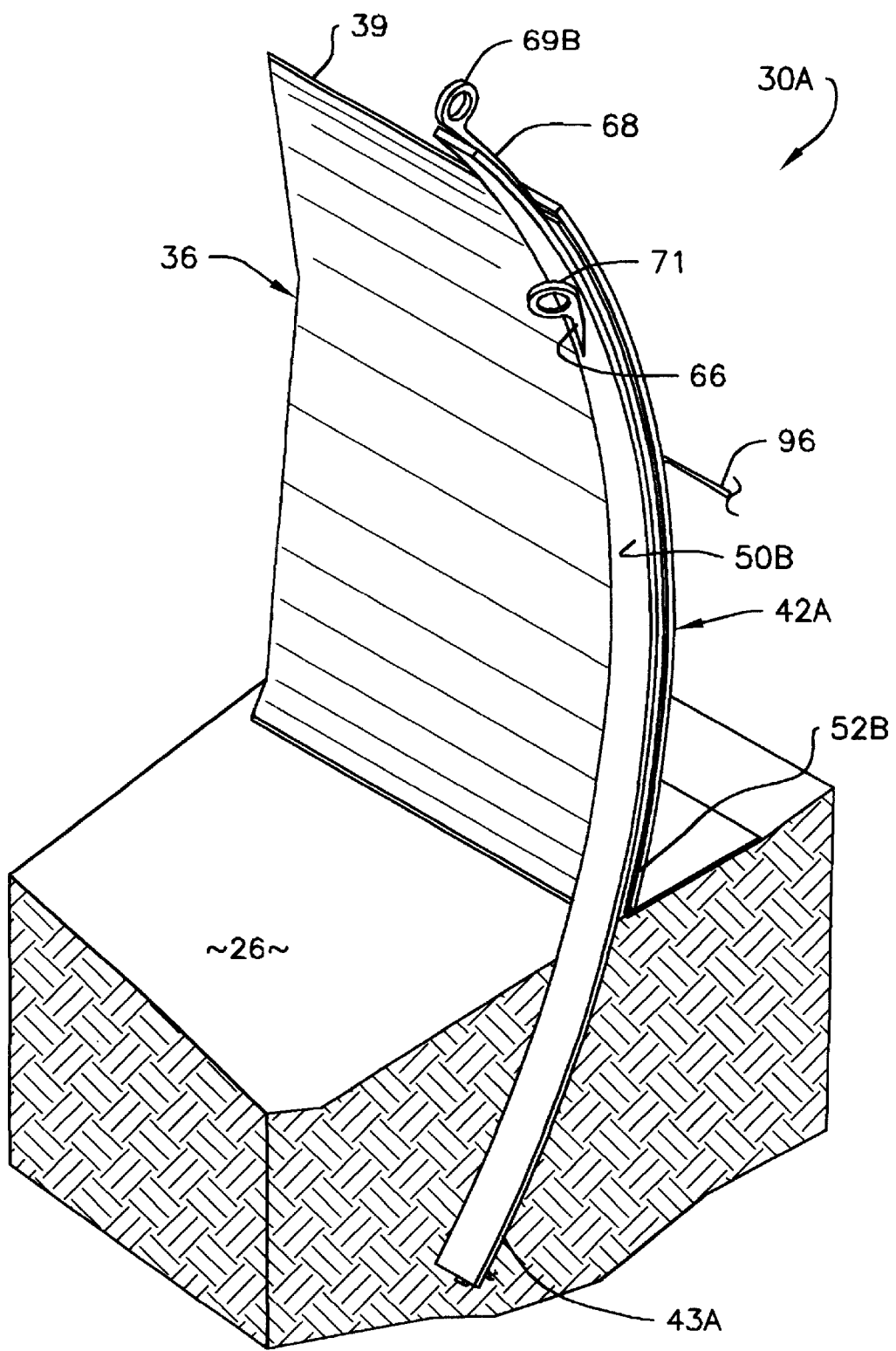
FIG. 8 is a fragmentary, side perspective view of an alternative right wall.

Referring to FIGS. 7 and 8, wall 35 receives upper drawstring 90, routed through eyelets 69, and lower drawstring 91, routed through suitable lower eyelets 71 (FIG. 8) on each wall interior. The lower ply separator string 92 (FIG. 7) extends longitudinally down the wall between adjacent plies. Opposed wall 36 (FIG. 8) likewise receives upper drawstring 90 through eyelets 69B, and lower drawstring 91 through eyelets 71. As before, these eyelets are preferably supported by the stiffeners. String 96 (FIG. 8) is an optional ply separator, for opening or separating the wall plies to admit more air, which is similar to string 92 (FIG. 7).

Thus the upper and intermediate drawstrings repeat in a zigzag fashion down the row, so that exposed ends of the drawstrings may be grasped by the farmer, and then pulled gently to close the system by contracting the walls. The drawstrings need to be constructed of a material that has minimal friction, and that is economically feasible. The less the friction, the longer a row length can be opened or closed by the strings. By maintaining fewer draw points in the row, drawstring friction is minimized.

The system is installed in the field or garden by unrolling each wall and pressing the support ribs in the ground. If, after field preparation, a light, fluffy planting bed results, the rib can be inserted into the ground without making a pilot hole with a bar or other implement The walls on each side should be spaced to allow the crop to grow without touching the plastic. This interval can be approximately twenty inches.

There will be an approximately two-inch flap of plastic wall at the ground that lies perpendicular with the support rib and runs parallel with the plant bed. This flap 37, formed from bottom wall portions (FIG. 5), acts as a seal to prevent cold or wind from entering the protection area. The flap does away with the need to place dirt at this intersection point to prevent the elements from entering. The flap also allows rainfall to easily roll off the plant bed as needed. If dirt used, rainfall could be trapped and causes adverse affects such as excessive fertilizer leaching, etc.

By opening our protection device on warm sunny days and closing it on cold days or nights, a grower can protect the crop. He or she can plant crops earlier, and crops can be grown later in the fall. In either case, with our system 30 the row cropper will have better quality and quantity yields. This benefit results from the more-favorable environment provided by our system 30. In other words, plants growing out in the open without system 30 will not experience as favorable a growing environment, particularly early and later on in the season. By thus controlling the growing environment, the farmer can achieve excellent high quality yields in marketing windows that would not result without our protection system and system 30.

After the danger of frost or freezing weather has passed, the grower can remove the system 30 for reuse next season by first removing the drawstring, pulling the ribs out of the ground, and then rolling up the device for storage. This system is very cost effective for commercial growers or gardeners since it is so easily recycled and stored between seasons.

The disclosed system has subtle advantages over a prior art mini greenhouse, row coverings, or row tunneling devices. It is pre-fabricated to allow for easy, cost effective installation. Further advantages include the ability to open or close the vent by simply pulling a string, the ability to manipulate several hundred row feet at a time, the ease of removal once the protection is no longer needed, and the ease of rolling up and removing the system at the end of a given season.

This invention allows a grower to plant the crops sooner than before because of its ability to protect from frost and freeze. The invention allows a grower to plant his crop later, knowing that the crop can be protected from the fall frost and freeze. This ability to effectively manage the environment enlarges the grower's harvesting and marketing windows. Further, it enables the growth of crops in specific areas that would otherwise not be possible.

This system allows a grower to harvest better quality and quantity yields by protecting the crop from wind damage. Wind can stress a plant or even blow away blooms from the plant Further, the system protects crops from excess rainfall. By closing the vents, flooding is prevented. Excess moisture cannot build up to damage the crop by washing away pollen, bruising the crop, or trigging disease outbreaks from fungus and the like.

This device can protect the crop from hail damage. By closing the vent, hailstones can be deflected from the crop. If left unprotected, the crop could easily be totally destroyed by hail or its yields left unmarketable from the damage. The system can protect a crop from deer, birds, raccoons, rabbits, and other animals, including insects.

This system is easier to install in the field than the row covers or fabrics currently used because no dirt has to be placed on top of the device to secure it from being blown away in the wind. It is easier to reuse the next season because no dirt has to be taken off of the device for removal. It provides greater thermal insulation because it is double layered.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matter herein set forth or shown in the accompanying drawings is to be interpreted as illustrative and not in a limiting sense.

What is claimed is:

1. A system for protecting crops laid out in rows upon elongated, parallel seedbeds, the system comprising:
    a pair of flexible, upright, user adjustable walls disposed upon each side of each seedbed, each wall comprising at least one ply of sheet-like material, the spaced apart walls defining an interior volume occupied by crops;
    a plurality of flexible, arcuate, support ribs disposed in orderly rows on each side of each seedbed for supporting the walls; and,
    drawstrings for selectively drawing the walls together or apart to either enclose said volume and protect said crops, or open said volume and expose said crops, wherein a top drawstring zigzags between adjacent walls for opening the walls if they are closed, and a lower drawstring zigzags between the walls for closing them if they are open.

2. The system as defined in claim 1 further comprising a plurality of spaced apart eyelets for constraining the drawstrings.

3. The system as defined in claim 2 wherein said eyelets are secured by said ribs.

4. The system as defined in claim 1 wherein the ribs comprise elongated metal stiffeners.

5. The system as defined in claim 4 further comprising a plurality of spaced apart eyelets for constraining the drawstrings, the ribs comprise elongated metal stiffeners, and wherein said eyelets are secured by said stiffeners.

6. The system as defined in claim 1 wherein each support rib comprises at least two aligned, corrugated plastic strips that overlie one another.

7. The system as defined in claim 6 wherein each rib comprises a relatively long inner strip that faces the seedbed, and a shorter strip coupled to the longer strip that forms the outside of the rib.

8. The system as defined in claim 7 wherein the ribs have bottoms adapted to be forced into the seedbed for supporting the ribs generally perpendicularly, and tops that project towards and overlie opposite walls when the system is closed.

9. The system as defined in claim 8 wherein the ribs comprise elongated metal stiffeners associated with said one or more strips, and said stiffeners comprise eyelets for guiding and constraining the drawstrings.

10. The system as defined in claim 9 wherein the metal stiffeners are sandwiched between rib strips.

11. The system as defined in claim 9 wherein the corrugated plastic ribs have flutes, and said metal stiffeners are inserted within rib flutes.

12. A row crop protector comprising:
a pair of flexible, upright, user adjustable walls adapted to be disposed upon each side of a seedbed to be protected, each wall comprising at least one ply of sheet-like material, the spaced apart walls defining an interior volume occupied by growing plants;
a plurality of flexible, arcuate, spaced-apart support ribs on each side of each seedbed for supporting the walls;
a first drawstring zigzagged between the walls for drawing them together to enclose said volume and protect said plants; and,
a second drawstring zigzagged between the walls for drawing them apart if the walls are closed, to expose said volume and said plants.

13. The protector as defined in claim 12 wherein said ribs comprise spaced apart eyelets for constraining the first and second drawstrings.

14. The protector as defined in claim 13 wherein the ribs comprise elongated metal stiffeners, and said eyelets are formed on said stiffeners.

15. The protector as defined in claim 14 wherein each support rib comprises a relatively long inner strip that faces the seedbed, a shorter strip coupled to the longer strip that forms the outside of the rib, bottoms adapted to be forced into the seedbed for supporting the ribs generally perpendicularly, and tops that project towards and overlie opposite walls when the system is closed.

16. The system as defined in claim 15 wherein the metal stiffeners are sandwiched between rib strips.

17. The system as defined in claim 15 wherein the ribs have flutes, and said metal stiffeners are inserted within rib flutes.

18. A method for protecting row crops comprising the steps of:
providing a pair of flexible, upright, user adjustable walls upon each side of a seedbed to be protected, each wall comprising at least one ply of sheet-like material, the walls defining an interior volume occupied by growing plants;
supporting the walls with flexible, arcuate, spaced-apart support ribs installed on each side of the seedbed;
closing the walls with a first drawstring zigzagged between the walls for drawing them together to enclose said volume and protect said plants; and,
opening the walls when closed with a second drawstring zigzagged between the walls for drawing them apart to thereby expose said volume and said plants.

19. The method as defined in claim 18 including the step of constraining said first and second drawstrings within spaced apart eyelets supported by said walls.

20. The method as defined in claim 19 including the steps of reinforcing the ribs with elongated metal stiffeners, and supporting said eyelets on said stiffeners.

* * * * *